(12) United States Patent
Tenereillo et al.

(10) Patent No.: US 7,099,915 B1
(45) Date of Patent: Aug. 29, 2006

(54) SERVER LOAD BALANCING METHOD AND SYSTEM

(75) Inventors: Peter Tenereillo, Vista, CA (US); Richard Howes, Roswell, GA (US); Edward Kersey, Alpharetta, GA (US); James Jordan, Roswell, GA (US); Shaheed Bacchus, Athens, GA (US)

(73) Assignee: Cisco Technology, Inc., San Jose, CA (US)

( * ) Notice: Subject to any disclaimer, the term of this patent is extended or adjusted under 35 U.S.C. 154(b) by 971 days.

(21) Appl. No.: 09/608,789

(22) Filed: Jun. 30, 2000

(51) Int. Cl.
*G06F 13/00* (2006.01)

(52) U.S. Cl. ...................... 709/203; 709/225
(58) Field of Classification Search ........ 709/200–203, 709/217–227
See application file for complete search history.

(56) References Cited

U.S. PATENT DOCUMENTS

| | | | |
|---|---|---|---|
| 6,163,796 A * | 12/2000 | Yokomizo | 709/203 |
| 6,249,836 B1 * | 6/2001 | Downs et al. | 710/268 |
| 6,351,775 B1 * | 2/2002 | Yu | 709/238 |
| 6,597,956 B1 * | 7/2003 | Aziz et al. | 700/3 |
| 6,609,213 B1 * | 8/2003 | Nguyen et al. | 714/4 |
| 6,801,949 B1 * | 10/2004 | Bruck et al. | 709/232 |
| 2001/0052024 A1 * | 12/2001 | Devarakonda et al. | 709/238 |

OTHER PUBLICATIONS

"ASP and Web Session Management;" MSDN Online Web Workshop, Michael P. Levy, Microsoft Consulting Services, Apr. 2, 1997.

* cited by examiner

*Primary Examiner*—Moustafa M. Meky
(74) *Attorney, Agent, or Firm*—Cindy Kaplan (57) ABSTRACT

A method and system for providing a connection between a client and a server with load balancing between servers are disclosed. A computer-implemented method of the present invention generally includes binding a primary virtual server to a set of URLs, each URL having an associated real server and receiving a request from a client for connection to the primary virtual server. One of the real servers are selected for connection with the client and a redirect message is sent to the client specifying the URL associated with the selected real server. The method further includes receiving a new connection request from the client for connection with the selected real server.

38 Claims, 7 Drawing Sheets

| Field | Description |
|---|---|
| Urlname *next | Next item in list |
| uchar name[40] | The name associated with the URL |
| uchar url[128] | The actual url string |
| ushort code | The return code to be used for this URL |
| ushort flags | Flags describing any macro substitutions used |
| Pmach *pmp | Pointer to a pmach structure used for this URL |
| Vmach *link | Pointer to DIP/virt to link this URL with |

*FIG. 6*

| Field | Description |
|---|---|
| Hname=0x0001 | Flag that says use hostname substitution |
| Pnum=0x0002 | Flag that says use port number substitution |
| Dname_0x0003 | Flag that says use directory name substitution |

*FIG. 7*

| Field | Description |
|---|---|
| Urlid *u | This is defined if this backup is a URL |

*FIG. 8*

| Field | Description |
| --- | --- |
| Urlid *u | If this real is a URL real this points to a Urlid structure |

FIG. 9

| Field | Description |
| --- | --- |
| Pmach_Url=0x0080 | Flag that designates this real as being a URL real |
| Pmach_DIP=0x0200 | Flag that says whether this real is part of a DIP |

FIG. 10

| Field | Description |
| --- | --- |
| Vmach_Link=0x0200 | Flag that designates this Vmach to be linked to a URL |
| Vmach_DIP=0x0800 | Flag that designates this Vmach to be part of a DIP |

SERVER LOAD BALANCING METHOD AND SYSTEM

BACKGROUND OF THE INVENTION

The present invention relates generally to server load balancing, and more specifically, to server load balancing using HTTP redirection.

Applications that communicate over the Internet typically communicate with each other over a transport layer Transmission Control Protocol (TCP) or User Datagram Protocol (UDP) connection. TCP/IP is an industry standard suite of protocols designed for large internetworks spanning wide area network (WAN) links. TCP/IP was developed in 1969 by the U.S. Department of Defense Advanced Research Projects Agency (DARPA), the result of a resource-sharing experiment called ARPANET (Advanced Research Projects Agency Network). The purpose of TCP/IP was to provide high speed communication network links. DARPA and other government organizations understood the potential of packet-switched technology and were just beginning to discover that virtually all companies with networks needed to support communication among dissimilar computer systems. With the goal of heterogeneous connectivity in mind, DARPA funded research by Stanford University and Bolt, Beranek, and Newman to create a series of communication protocols. The result of that development effort was the Internet protocol suite, of which the Transmission Control Protocol (TCP) and the Internet Protocol (IP) are the two best-known members.

TCP is a connection-orientated transport layer protocol that sends data as an unstructured stream of bytes. By using sequence numbers and acknowledgment messages, TCP can provide a sending node with delivery information about packets transmitted to a destination node. Where data has been lost in transit from source to destination, TCP can retransmit the data until either a timeout condition is reached or until successful delivery has been achieved. TCP can also recognize duplicate messages and will discard them appropriately. If the sending computer is transmitting too fast for the receiving computer, TCP can employ flow control mechanisms to slow data transfer. TCP can also communicate delivery information to the upper-layer protocols and applications it supports. As a result of these capabilities, TCP is a connection oriented protocol.

IP is the primary network layer protocol in the Internet suite. In addition to internetwork routing, IP provides error reporting and fragmentation and reassembly of information units called datagrams for transmission over networks with different maximum data unit sizes. In the TCP/IP protocol, in order to properly route packets, it is necessary to use the source IP address and port number and the destination IP address and port number found in the packet header.

For many business enterprises, it has become important to reach customers, vendors, and employees through the Internet. Web-based communication is different from mainframe and client-server arenas. One difference is that HTTP (HyperText Transfer Protocol), an underlying protocol of Web communication, is both connectionless and stateless. This causes a problem for dynamic interactions with the user where a Web system needs to be able to keep track of the user's state during a session involving multiple Web interactions (e.g., Web page requests). Without a way to manage state between Web transactions, the system will forget information about the user and the context of the session. This can be further complicated by the fact that in many large Web systems the user does not interact with the same Web server from transaction to transaction.

Moreover, in Web applications, it is often necessary to provide a persistent or "sticky" connection between a browser (the user) and the Web or database server to which it is connected. A sticky connection allows a server load balancer to direct each client connection in a session to the same server so that all requests from a given client are redirected to the same server and the client remains attached to a single server for the duration of the transaction between the client and the server. Examples of applications that require a sticky connection include shopping baskets, financial transactions, and some forms of interactive games. Because HTTP does not carry any state information for these applications, it is important for the browser to be mapped to the same server for each HTTP request until a user's transaction is complete.

The sticky connection is often controlled by a configurable timer. If the timer is configured on a virtual server, new connections from a client are sent to the same real server that handled the previous client connection, provided that the amount of time between the end of a previous connection from the client and the start of a new connection is within the timer duration. If a session is timed out, the client may be connected to a different real server, thus losing state information.

Current implementations of sticky use the client IP address/TCP port, SSL session ID, or a user's cookies. As described below, each of these methods has drawbacks.

A TCP connection is initialized through a three-way handshake which is used to synchronize the sequence number and acknowledgement numbers of both sides of the connection and exchange segment sizes. The client first sends a TCP segment to the server with an initial sequence number for the connection and maximum segment size. The server sends back a TCP segment containing its chosen initial sequence number, an acknowledgement of the client's sequence number, and a maximum segment size. The client then sends a TCP segment to the server containing an acknowledgement of the server's sequence number. If an acknowledgement is not received within a specified period of time a browser may time out the session.

Furthermore, the client IP address is not effective when connections to the Internet service provider (ISP) pass through a proxy server. In many network applications, it is often desirable or necessary to prevent a user from making a direct connection to a machine that has information that the user needs. For example, it is often desired from a security standpoint not to allow connections from potentially hostile machines to a machine that stores sensitive information. Instead, it may be required that a connection first be made to a proxy which itself has various security features such as user authentication and possibly encryption. Also, there are cases where thousands of users are coming into a site from a mega proxy (e.g., America On-Line (AOL) users) all accessing the same application and all coming from the same source IP address. In this scenario, a sticky requirement causes all client connections to be directed to the same real server, thus creating a load imbalance. The load imbalance may be worsened if the proxy server is located directly in front of the server load balancer, which is a common practice for site security.

SSL (secure socket layer) is encryption technology used to provide secure transactions on the Web, such as the transmission of credit card numbers for e-commerce. The SSL protocol uses a combination of public key and symmetric key encryption. An SSL session also begins with an exchange of messages called the SSL handshake. The handshake allows the server to authenticate itself to the client using public key techniques, then allows the client and the server to cooperate in the creation of symmetric keys used for rapid encryption, decryption, and tamper detection during the session that follows. Web sites that use mixed SSL/non-SSL connections create problems for sticky connections. An example of a mixed SSL/non-SSL connection is an online vendor who provides a shopping cart for use in collecting items for purchase while browsing. Since the contents of the shopping cart are not considered confidential, most administrators deploy this area of the site in non-SSL pages. However, at checkout time when confidential information such as the user's credit card number is entered, the vendor switches to a secure SSL connection. Since the SSL session ID is effective only when the server is running SSL, the client may be switched to a different server during the transaction.

The cookie sticky keeps clients directed to the same physical or real server using standard HTTP cookie technology. Cookies are strings passed from servers to browsers using HTTP. After a client has received a cookie as the result of a "set cookie" HTTP command, any server can poll that cookie, providing it knows the structure, with a "get cookie" command. This allows the querying server to positively identify the client as the one that received the cookie earlier. In a server load balancer implementation, this technology may be used to route users back to the same real server based on the cookie the client shows the server load balancer. The cookie sticky typically does not work with SSL since the cookies are encrypted. Furthermore, the cookie can also time out, thus resulting in a new connection being made with possibly a different server.

There is, therefore, a need for a method and system for implementing sticky connections while performing effective load balancing whether or not SSL is running and despite the presence of a proxy server.

SUMMARY OF THE INVENTION

A method and system for providing a connection between a client and a server with load balancing between servers are disclosed.

A computer-implemented method of the present invention generally includes binding a primary virtual server to a set of URLs, each URL having an associated real server and receiving a request from a client for connection to the primary virtual server. One of the real servers is selected for connection with the client and a redirect message is sent to the client specifying the URL associated with the selected real server. The method further includes receiving a new connection request from the client for connection with the selected real server.

The method may further include binding each of the real servers to a virtual server, with each set of real and virtual servers having the same IP address. The corresponding real and virtual servers may share weight assignments and state information. The primary virtual server or another real server may act as a backup for the real servers.

In another aspect of the invention, a method generally includes receiving a request from a client for connection to a primary virtual server. The primary virtual server is bound to a plurality of secondary virtual servers each associated with a real server and having the same address as the real server. One of the real servers is selected for connection with the client and a redirect message is sent to the client specifying the selected real server. A new request is then received from the client for connection to the selected real server. The method further includes forwarding to the selected real server transmission originating from the client and forwarding to the client transmission originating from the selected real server.

A computer program product of the present invention generally comprises code that binds a primary virtual server to a set of URLs, each URL having an associated real server and code that receives a request from a client for connection to the primary virtual server. The product further includes code that selects one of the real servers for connection with the client, code that sends a redirect message to the client specifying the selected real server, and code that receives a new request from the client for connection to the selected real server. The product further includes a computer-readable storage medium for storing the codes.

In another aspect of the invention, a computer program product for binding a plurality of real servers to a primary virtual server for establishing connections between a client and the real servers, generally comprises code that binds the real servers to the primary virtual server, code that creates a plurality of secondary virtual servers each associated with one of the real servers and having the same address as the associated real server, and code that binds each of the secondary virtual servers with its associated real server. The product further includes a computer-readable storage medium for storing the codes.

In yet another aspect of the invention, a computer system generally comprises a virtual server, a plurality of real servers each having an associated URL, and a processor for binding the virtual server to the URLs of the real servers, selecting one of the real servers for connection to a client, and redirecting a connection request for the virtual server from the client to the selected real server.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The present invention operates in the context of a data communication network including multiple network elements. Some of the elements in a network that employs the present invention may be network devices such as routers and switches. For example, some of the nodes may be specially configured routers such as those available from Cisco Systems, Inc. of San Jose, Calif. As used herein the term router is used to refer to devices that forward packets based on network and higher layer information. The router may include, for example, a master central processing unit (CPU), interfaces, and a bus (e.g., a PCI bus). The CPU preferably includes a memory and a processor. When acting under the control of appropriate software or firmware, the CPU is responsible for such router tasks as routing table computations, network management, and general processing of packets. It preferably accomplishes all these functions under the control of software including an operating system (e.g., a version of the Internetwork Operating System (IOS®) of Cisco Systems, Inc.) and any appropriate applications software. The CPU may include one or more processors such as a processor from the Motorola family or microprocessors of the MIPS family of microprocessors. In an alternative embodiment, the processor is specially designed hardware for controlling the operations of router. Memory can be non-volatile RAM and/or ROM. However, there are many different ways in which memory could be coupled to the system. In an alternative embodiment, a router or switch may be implemented on a general purpose network host machine such as the computer system of FIGS. 1 and 2.

Figure 1:
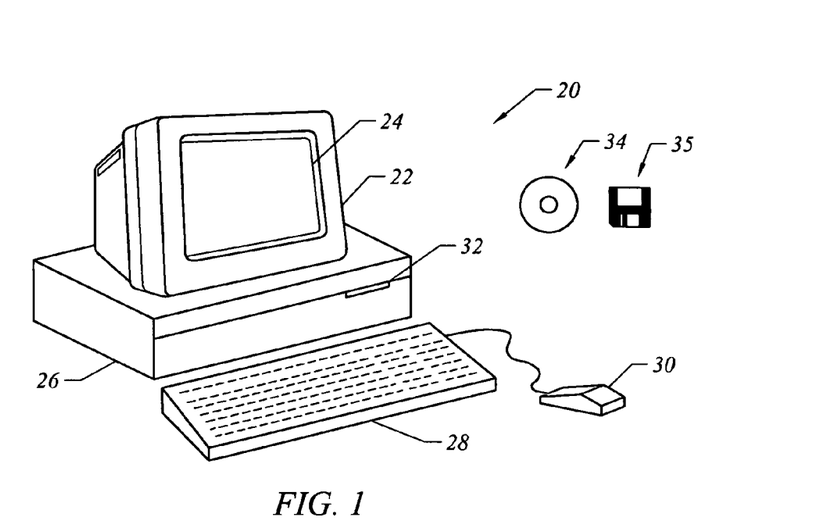
FIG. 1 is a schematic illustrating an example of a computer system that can be utilized to execute software of an embodiment of the present invention.

FIG. 1 illustrates an example of a computer system that may be used to execute software of an embodiment of the invention. The computer system 20 includes a display 22, screen 24, cabinet 26, keyboard 28, and mouse 30 which may include one or more buttons for interacting with a GUI (Graphical User Interface). Cabinet 26 houses a CD-ROM drive 32, system memory 42 and a hard drive 44 (see FIG. 2) which can be utilized to store and retrieve software programs incorporating computer code that implements aspects of the invention, data for use with the invention, and the like. Although CD-ROM 34 and floppy disk 35 are shown as exemplary computer readable storage media, other computer readable storage media including tape, flash memory, system memory, and hard drive may be utilized. Additionally, a data signal embodied in a carrier wave (e.g., in a network including the Internet) may be the computer readable storage medium.

Figure 2:
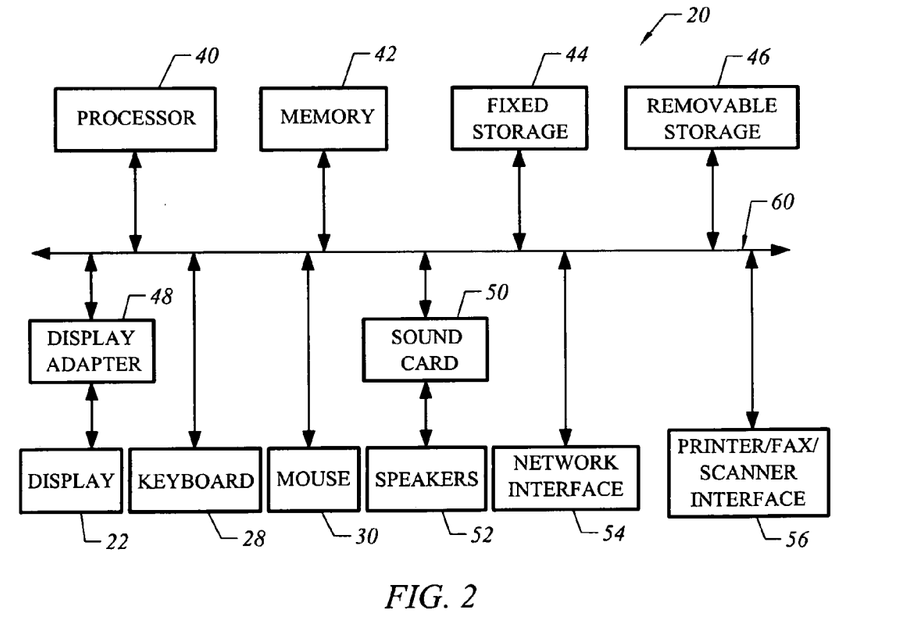
FIG. 2 is a system block diagram of the computer system of FIG. 1.

FIG. 2 shows a system block diagram of computer system 20 used to execute software of an embodiment of the invention. Computer system 20 further includes subsystems such as a central processor 40, system memory 42, fixed storage 44 (e.g., hard drive), removable storage 46 (e.g., CD-ROM drive), display adapter 48, sound card 50, transducers 52 (speakers, microphones, and the like), network interface 54, and printer/fax/scanner interface 56. The computer system may also include inside and outside high speed Local Area Network (LAN) interfaces, for example. The inside interface may be connected to a private network, while the outside interface may be connected to an external network such as the Internet. Preferably, each of these interfaces includes a plurality of ports appropriate for communication with the appropriate media, and associated logic, and in some instances memory. The associated logic may control such communications intensive tasks as packet integrity checking and media control and management. The high speed interfaces are preferably multiport Ethernet interfaces, but may be other appropriate interfaces such as FDDI interfaces. Other computer systems suitable for use with the invention may include additional or fewer subsystems. For example, computer system 20 may include more than one processor 40 (i.e., a multi-processor system) or a cache memory.

The system bus architecture of computer system 20 is represented by arrows 60 in FIG. 2. However, these arrows are only illustrative of one possible interconnection scheme serving to link the subsystems. For example, a local bus may be utilized to connect the central processor 40 to the system memory 42 and display adapter 48. The computer system 20 shown and described herein is only one example of a computer system suitable for use with the invention. Other computer architectures having different configurations of subsystems may also be utilized. Communication between computers within the network is made possible with the use of communication protocols, which govern how computers exchange information over a network.

Internet service providers (ISPs) and other Internet content providers commonly maintain Web sites for their customers. This service is called Web hosting. Each Web site is associated with a Web host. A Web host may be a physical Web server (real server) or a logical entity, referred to as a virtual Web host (virtual server). A virtual server associated with a large Web site may span multiple real servers. Conversely, several virtual servers associated with small Web sites may share a single real server. In either case, each virtual server provides the functionality of a single real server in a way that is transparent to the client. The Web sites hosted on a virtual Web host may share server resources, such as CPU cycles and memory, but are provided with all of the services of a dedicated Web server. A virtual server has one or more public virtual IP address that clients use to access content on the virtual server. The virtual IP address is an IP address which the outside world, including the rest of the Internet, uses to access an internet site implemented on either one or some combination of the physical machines which make up the group of real servers. The individual identities and IP addresses of the individual real servers are not evident to the user. A Web host is uniquely identified by its public virtual IP address. As further described below, the present invention binds the virtual server to real servers to provide access directly to the real servers.

Figure 3:
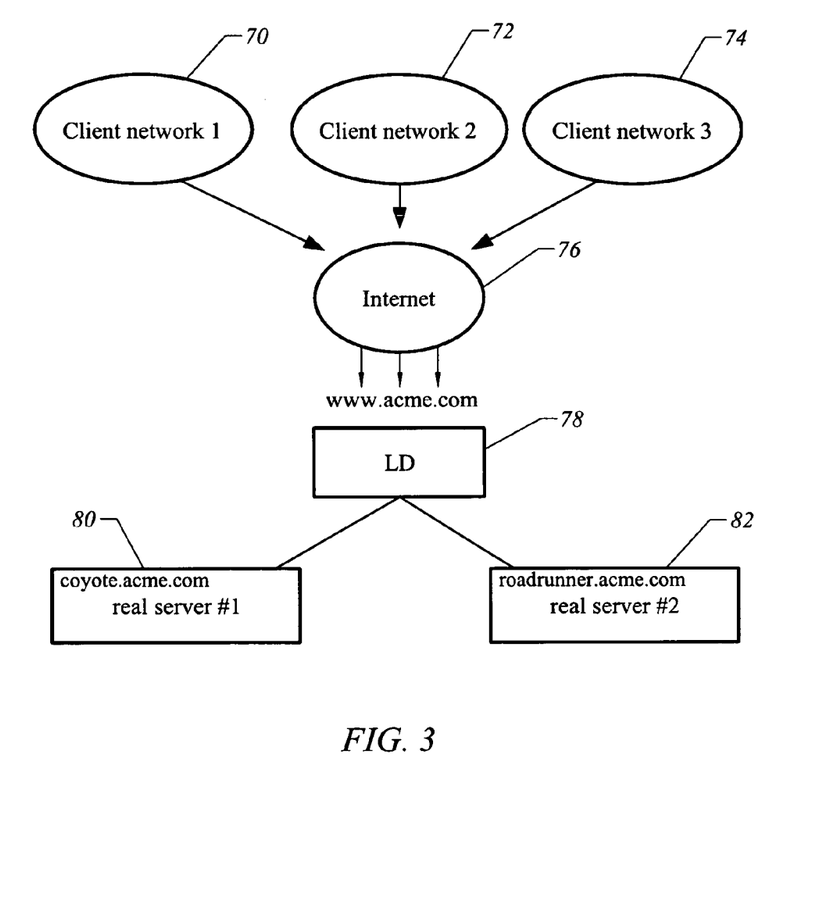
FIG. 3 is a schematic illustrating a local director positioned to provide load balancing between two real servers.

FIG. 3 is a block diagram of a network segment which includes a plurality of client networks 70, 72, 74, a local director 78, and two real servers 80, 82. The user who is accessing an Internet site via the local director 78 is referred to as the client and the group of machines associated with the local director are referred to as servers. In certain applications, however, the group of machines associated with the local director 78 may be considered the client and the device on the other side of the local director considered the server. A plurality of virtual machines may be implemented on different port numbers on certain of the real or physical machines. Other physical machines may be configured to service only one specific domain name. Each virtual machine may allocate connections to a plurality of physical machines, or on a single physical machine if desired. The real servers may include any number or type of servers. The real servers 80, 82 may be, for example, TCP based servers acting as World Wide Web servers, FTP servers, mail servers, news servers, database servers, or Telnet servers. It should be noted that, although the embodiment described establishes connections to the Internet using TCP/IP, the present invention may also be used in conjunction with other protocols such as UDP (User Datagram Protocol).

When a router receives a request to access an internet site supported by the local director 78 by a domain name (e.g., www.acme.com), that domain name is mapped to the IP address of the internet site by a DNS (domain name service) server. DNS translates a name to a numeric address and inserts it into a message for transport. The DNS server does not provide a real IP address of a real machine, but instead provides a virtual IP address of a virtual machine which is implemented on the local director 78. The local director 78 then receives all packets sent to virtual IP addresses implemented on the local director. When a packet is received by the local director 78 from the communication path to the virtual server, the packet is processed by a protocol stack through a series of layers. The packet comes in through a physical layer. Typically, the physical layer implements Ethernet or some other well known protocol. Packets are passed up to an IP layer and are processed according to the IP protocol. The TCP/IP protocol resolves the source IP address, the source port number, the destination IP address, and the destination port number, which are all found in the IP header.

The local director 78 serves as a front end to the group of real servers 80, 82. Requests from external sites on the Internet 76 are routed through the local director 78 which performs server load balancing (SLB) to determine which server or group of servers should receive the request. The local director 78 may include a service manager (such as CASA, developed by Cisco Systems, Inc. San Jose, Calif.) which makes the load balancing decisions based on application availability, server capacity, and load distribution, for example. Load balancing algorithms such as round robin, least connections, dynamic feedback, or other load balancing applications may be used, as well known by those skilled in the art. The local director 78 may further include one or more forwarding agents which forward packets based on instructions received from the service manager. The local director may include a real-time embedded operating system (RTOS) such as Finesse developed by Cisco Systems, Inc. of San Jose, Calif., for example. The local director may be configured as described in U.S. patent application Ser. No. 09/347,034, filed Jul. 2, 1999, which is incorporated herein by reference in its entirety, and it is still pending.

It is to be understood that the local director 78 may be different than described herein or the server load balancing may be accomplished with a device other than a local director, without departing from the scope of the invention.

The present invention utilizes HTTP redirection to implement persistent connections and allow the local director 78 to perform effective load balancing, whether or not SSL is running and despite the presence of a proxy server. As further described below, the real servers 80, 82 are bound to a primary virtual server. Once the local director 78 selects a real server based on load balancing or other applicable considerations, client requests for connection to the virtual server are redirected to one of the real servers 80, 82 bound to the virtual server through the use of an HTTP redirect which includes the URL (Uniform Resource Locator) of the selected real server.

The HTTP URL scheme is used to designate Internet resources accessible using HTTP (HyperText Transfer Protocol). HTTP is the standard Web transfer protocol specifically designed for use with the World Wide Web. HTTP provides requests from browsers to servers and the set of responses going the other way. URL is a standard developed to specify the location of a resource available electronically. A URL contains the protocol (e.g., http), the DNS name (e.g., www.acme.com), and possibly a file name (e.g. book.html). URLs are used to locate resources, by providing an abstract identification of the resource location. It is to be understood that the term URL as used herein is meant to simply identify a resource location and may have configurations other than described herein, without departing from the scope of the invention.

Figure 4:
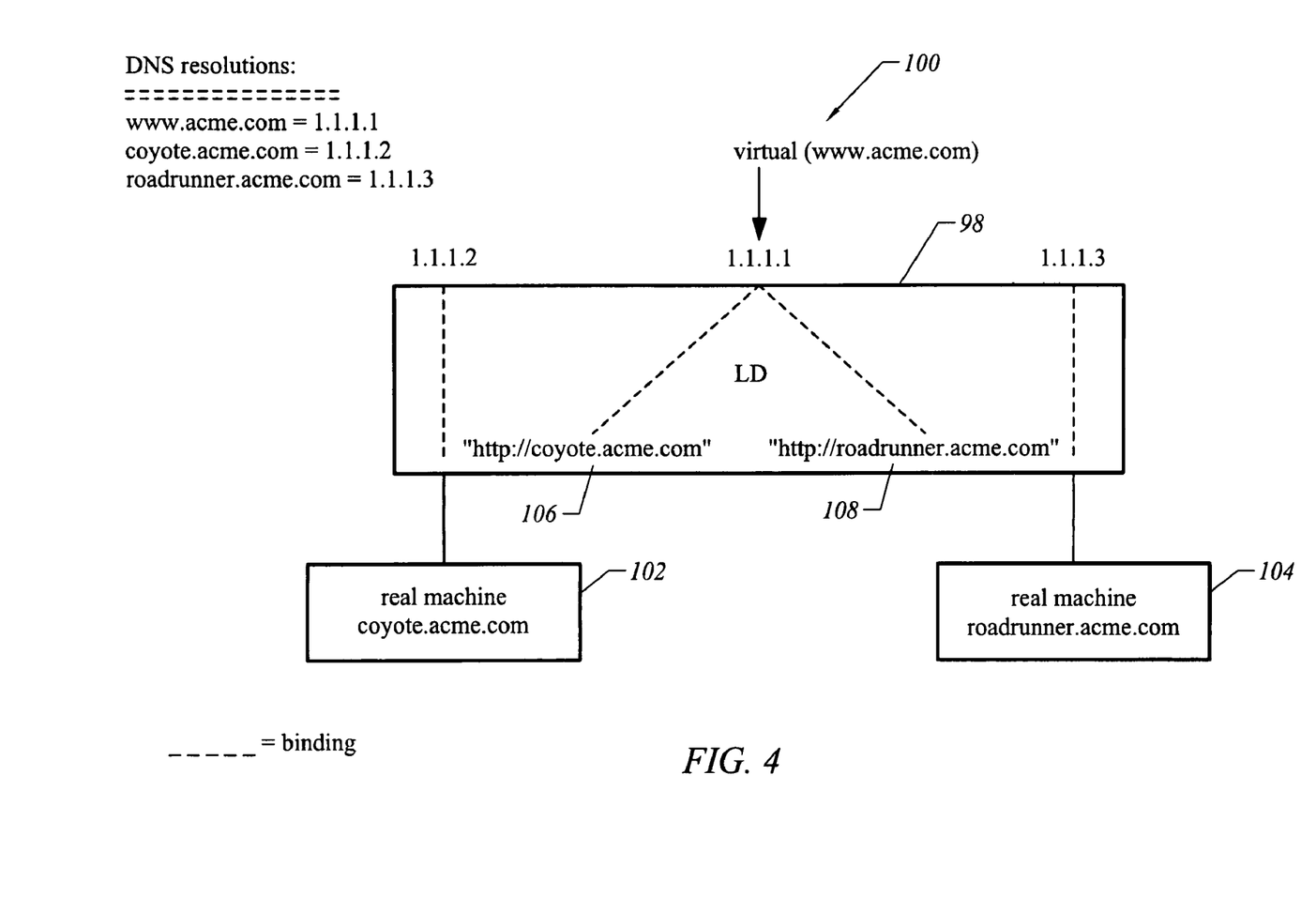
FIG. 4 is a block diagram illustrating a local director configured for HTTP redirection of the present invention.

FIG. 4 shows a local director 98 configured for HTTP redirection of the present invention. The implementation of HTTP redirection may be within the application level of the server load balancer. Conventional virtual servers are typically bound to real servers which are defined as a combination of the real server's IP address, port, bind-ID, protocol, and service state. The HTTP redirection method of the present invention provides a bind command which allows a URL associated with a real server to be bound to virtual servers. A new type of identifier, referred to as a directed-IP (DIP) is provided to allow 1-to-1 bindings between virtual servers and real servers, where both the real and virtual servers have the same IP address. As described below, a link command is used to link DIPs or virtual servers to a URL. When a DIP is linked to a URL, the URL dynamically inherits any weights or special states that are assigned to the real component of that DIP. URLs as well as the DIP structures are preferably defined in the local director code.

As shown in FIG. 4, primary virtual server 100 (identified as "www.acme.com") is bound to the URLs "http://coyote.acme.com" and "http://roadrunner.acme.com." These URLs are also bound to the real servers 102, 104. DIPs are used to create secondary virtual servers 106, 108, which are also bound to the real servers 102, 104, respectively. The following describes a sequence of commands used to create these bindings. A first command "virtual 1.1.1.1" creates the virtual server 1.1.1.1 (corresponding to "www.acme.com" as shown in the DNS resolution table of FIG. 4). The next two commands are used to create an alias for the new URLs, which will be associated with the real servers 102, 104:

URL coyote http://coyote.acme.com
    URL roadrunner http://roadrunner.acme.com These two URLs are then bound to the virtual server 1.1.1.1:
    bind 1.1.1.1. coyote roadrunner The following command introduces DIPs to create a real server and a virtual server with the same IP address as the real servers 102, 104, respectively, and bind the servers (102 and 106) (104 and 108) together:
    direct—ip 1.1.1.2 (creates virtual/real binding for 1.1.1.2)
    direct—ip 1.1.1.3 (creates virtual/real binding for 1.1.1.3)

The new URLs can now be associated with the new DIPs created above:
    link coyote 1.1.1.2
    link roadrunner 1.1.1.3

This allows any states or weights associated with the DIPs (from real servers 102, 104) to be associated with the URL. The above commands thus created two new URLs which are associated with the real servers 102, 104 and two new virtual servers 106, 108 which are bound to the real servers, and bound the virtual server 100 to the new URLs. The local director 98 is now ready for HTTP redirection.

Figure 5:
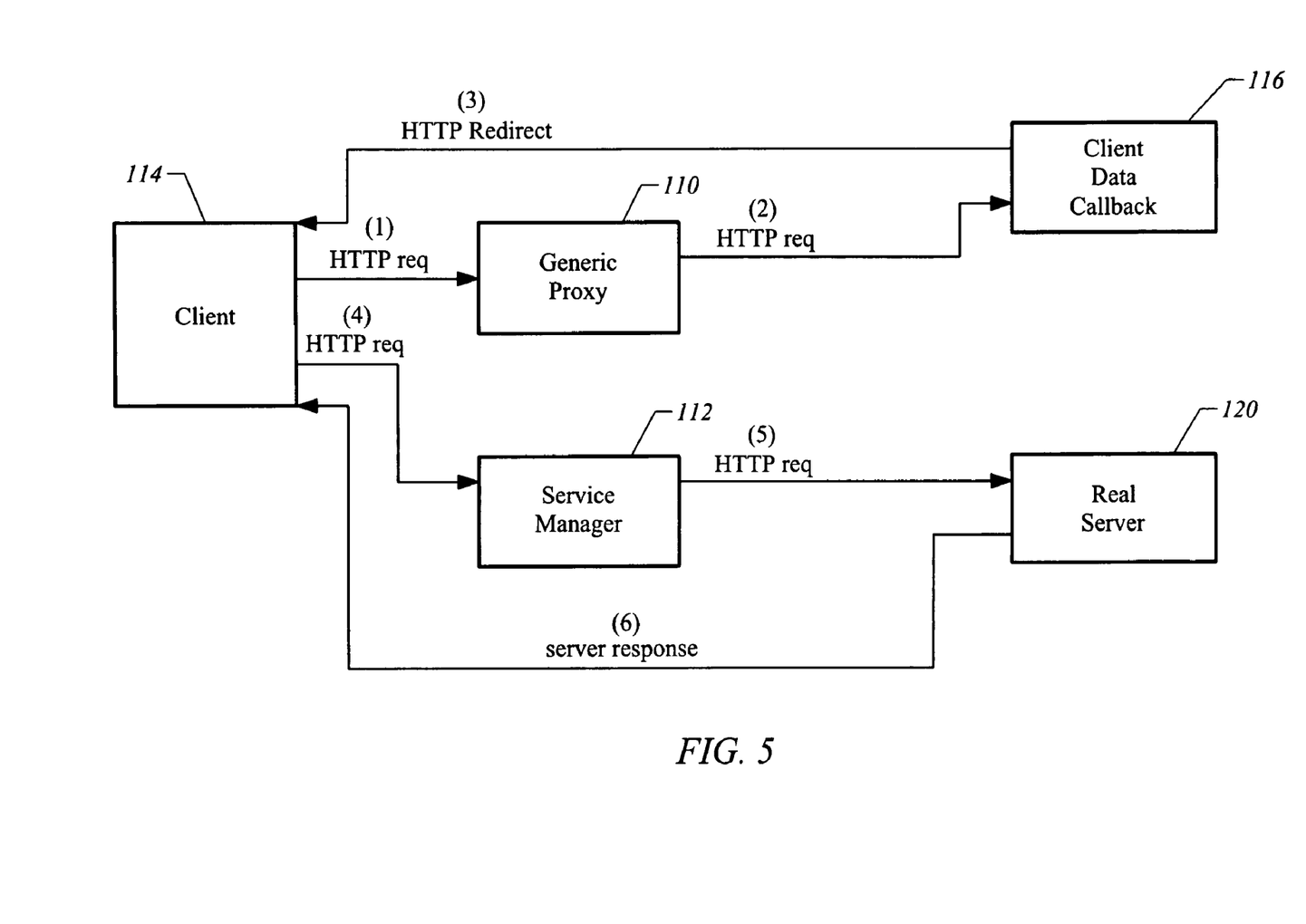
FIG. 5 is a block diagram illustrating system flow for HTTP redirection.
Figure 6:
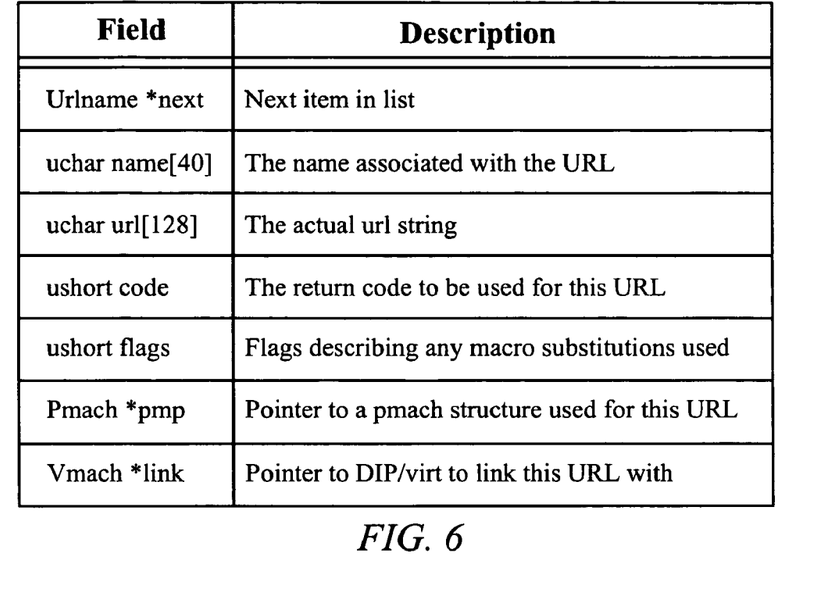
FIG. 6 illustrates a data structure for a URL ID.
Figure 7:
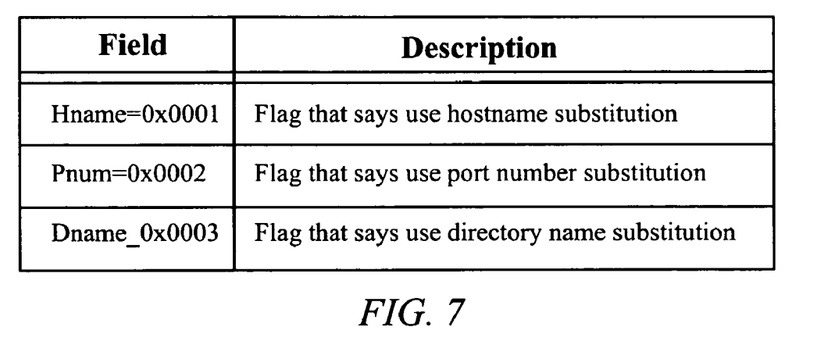
FIG. 7 illustrates a data structure for a URL flag.
Figure 8:
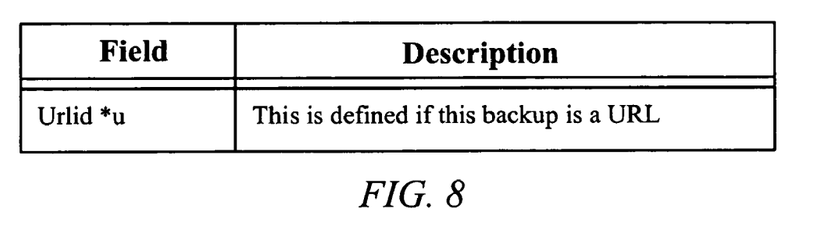
FIG. 8 illustrates a backup data structure.
Figure 9:
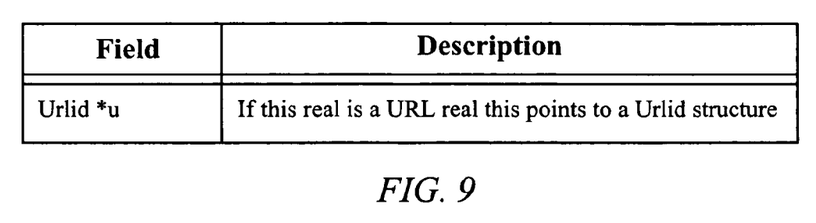
FIG. 9 illustrates a Pmach data structure.
Figure 10:
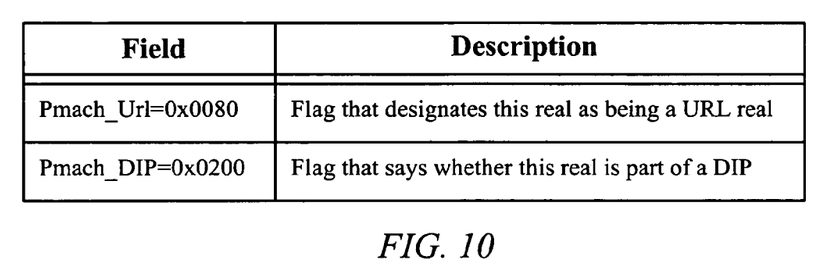
FIG. 10 illustrates a data structure for a Pmach flag.
Figure 11:
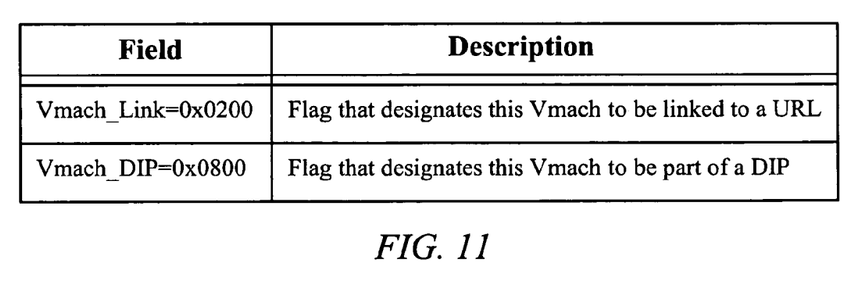
FIG. 11 illustrates a data structure for a Vmach flag.

FIG. 5 is a block diagram illustrating system flow through the local director 98 for HTTP redirection. Each step is identified by a number (1–6) on the diagram. The generic proxy 110 and service manager 112 may both be located on the local director 106. An HTTP request is first made by the client 114 at step 1. The proxy interface 110 creates a client data callback 116 (step 2). The client data callback 116 processes the request, decides which URL (i.e., which real server) to send the client 114 and makes any necessary macro substitutions to the URL (as described below). An HTTP redirect with the modified URL (corresponding to the new DIP) is sent back to the client 114 and the connection is closed (step 3). The client 114 then sends a new HTTP GET request to the service manager 112 based on the HTTP redirect received (step 4). The service manager 112 forwards the request to the selected real server 120 (step 5) and the real server passes the content obtained from the Web site to the client 114 (step 6).

FIGS. 6–11 illustrate data structures for the URL ID, URL flags, backup structure, Pmach (physical machine) structure, Pmach flags, and Vmach (virtual machine) flags. The URL ID structure is created to hold the information associated with a URL. The URL flags list enumerated types that are defined to represent the macros in a URL. The rest of the data structures provide fields that are added to a backup structure, Pmach structure, Pmach flags, and Vmach flags within the server load balancer application code.

When a connection comes into the virtual server 100 on the local director 98, it assigns the connection to one of the real servers 102, 104 based on the predicator that has been selected. If the real server has a URL, an HTTP redirect is issued to the browser. The browser then issues another HTTP GET request, which goes to one of the secondary virtual servers 106, 108 that has one of the real servers 102, 104, respectively, bound to it with the same IP address. The request is then passed to the real server.

On the real machines 102, 104, the Web servers are preferably configured so that links are relative (for example, links are preferably in the form "images/logo.gif", rather than "http://www.acme.com/images/logo.gif"). Most Web servers are capable of dynamically generating absolute links by inserting the contents of the HOST parameter on the incoming HTTP request. This method requires the name of the real server to be DNS registered and resolve to a valid IP address. This ensures that when connections are redirected from "www.acme.com" to one of the real machines 102, 104, they stay on the same machine. There are instances, however, when it is not possible to have relative links. An example of this is a non-SSL page that wants to connect to an SSL page (i.e., the shopping cart problem described above). In this scenario absolute links that point to the same machine from which the page originated are preferably used. For example, if the non-SSL page "/cart.html" on the coyote server 102 needs to link to the SSL page "/checkout.html", then the link used may be of the form "http://hostname/checkout.html" where hostname=coyote.acme.com.

The following describes an exemplary sequence of an HTTP request received at the virtual server "www.acme.com" in FIG. 4. The client browser first initiates a connection to the virtual server 100 by sending an HTTP request:
GET/HTTP/1.0
User-Agent: Mozilla/4.5 [en] (WinNT:U)
Host: www.acme.com The local director 98 uses the predictor value (derived through load balancing) to determine that "coyote.acme.com" is the URL that the connection should be redirected to (i.e., the request should be sent to the "coyote.acme.com" real server 102). The local director 98 then issues an HTTP redirect to the client browser:
HTTP/1.1 302 Found
Server: LocalDirector 3.4 (Finesse)
Location: coyote.acme.com
Connection: close
Content-Type: text/html Client browsers such as Netscape and Internet Explorer, understand that the HTTP code 302 means redirect. The browser then issues a new HTTP GET request based on the location field of the HTTP redirect shown above:
GET/HTTP/1.0
User-Agent: Mozilla/4.5 [en] (WinNT:U)
Host: www.acme.com The request goes to the "coyote.acme.com" real server 102 and stays there until the client is finished with the session.

After a user is redirected to a URL, the user may choose to bookmark the address. This will work as long as the real server associated with the URL is functioning when the user attempts to use the bookmark at a later time. However, if the real server associated with the URL is down, the connection will not be made. To prevent this from happening, a backup may be defined for the real server using a backup command. For example, the following command may be issued:
backup 1.1.1.2 1.1.1.1

This command designates the virtual server 100 as the backup for the real server 102. If the user now attempts to make a connection to the real server 102 while it is down, the connection is forwarded to the virtual server 100 and the process of issuing a new HTTP redirect starts again. The real server 102 may also be backed up by another real server (e.g., "roadrunner.acme.com" real server 104). The backup command may also be used to allow the user to backup virtual servers with a URL. This will give Web site administrators the option of allowing their clients to be redirected to another site if their site fails.

A URL may be used as backup to a real or virtual server. For example, the following commands may be used to define a backup for a URL:
url book http://www.book.com
direct—ip 1.1.1.2
backup 1.1.1.2 book If a user has 1.1.1.2 bookmarked and the DIP is out of service when they select the bookmark, they will get an HTTP redirect to http://www.book.com, which can be the primary virtual server.

Figure 12:
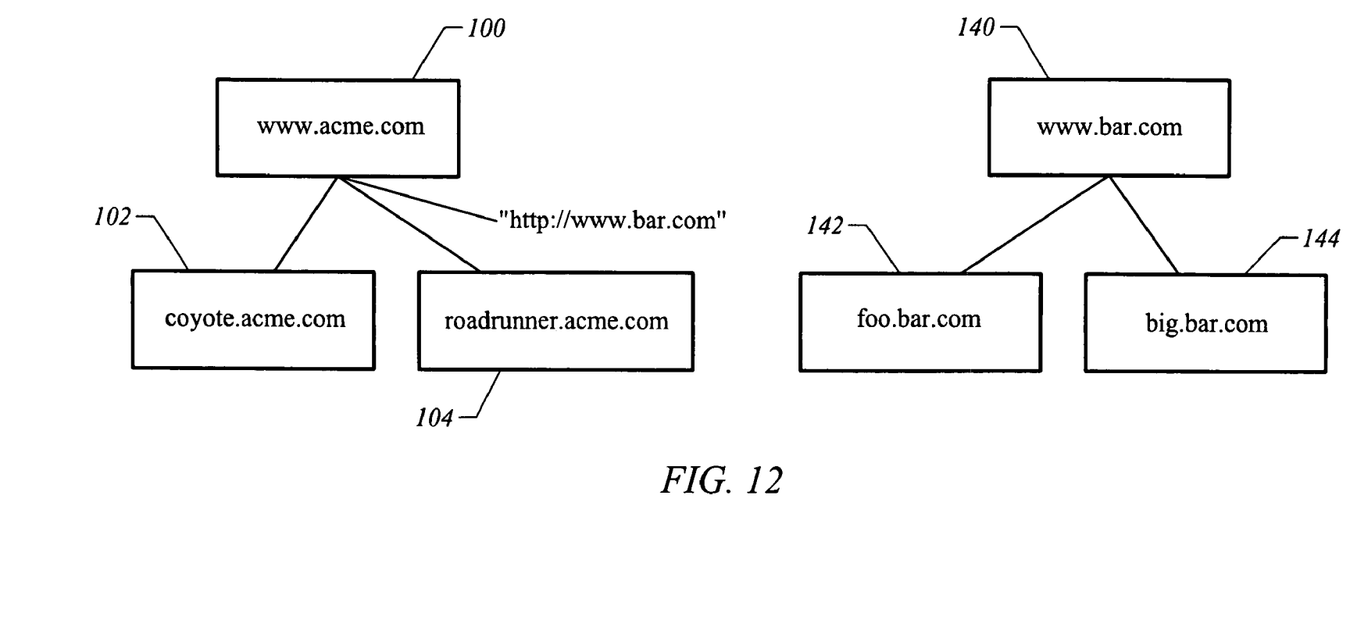
FIG. 12 is a block diagram illustrating load sharing via HTTP redirection of the present invention.

A URL may also be used as a backup if it is desired to direct a portion of a site load to another site. The following commands may be used, for example, to direct a third of the traffic at the site for virtual 1.1.1.1 to site http://www.book.com:
virtual 1.1.1.1
real 1.1.1.2
real 1.1.1.3
url book http://www.book.com
bind 1.1.1.1 1.1.1.2
bind 1.1.1.1 1.1.1.3
bind 1.1.1.1 book HTTP redirection also provides a method for implementing load sharing between different sites as shown in FIG. 12. For example, if the "www.acme.com" server 100 and "www.bar.com" server 140 share common data but the "www.acme.com" server is busier, HTTP redirection can be used to distribute the data more uniformly. As shown in FIG. 12, the real server 140 is bound to the www.acme.com server 100. If a round robin predictor is used, approximately one third of the requests to the "www.acme.com" server 100 will be directed to the "www.bar.com" server 140, while the other two thirds are distributed between the "coyote.acme.com" server 102 and the "roadrunner.acme.com" server 104. The www.bar.com server 140 may also be linked to two additional servers 142, 144. This method may be used, for example, by a Web site that is expecting a temporarily large number of hits to service the requests without having to purchase new hardware.

The following commands may be used to implement the HTTP redirection described above. The user may, for example, specify a short identifier that can be used to represent a URL string with the following command:

url <url_id><url_string>[code]
where:
url_id: ID for the URL itself;
url_string: URL that the alias is being created for; and
code: return code to be used in the redirect. Code is optional and if no code is entered the default of 302 is used.

The "url_string" is preferably a valid URL of the form "http://www.acme.com". The string may also contain macros that instruct the local director to retain portions of the original requests in the redirect URL. Valid macros include:
% h—hostname
% s—port number
% d—directory Thus, a valid URL may also be written as:
http:/%h/new/%d.

The following command may be used to bind one or more real servers to a virtual server:
[no] bind <virtual_id><real_id|url_id>|<real_id|url_id> . . . ]
where:
virtual_id is the virtual that is being bound to
real_id is a regular real ID; and
url_id is the ID for a URL, as defined by the url command.

The following command may be used to specify a backup to use if the real or virtual server that is applied to goes out of service:
[no] backup <real_id|virtual_id><backup_id>
where:
backup_id may be a url_id.

The following dip command creates a virtual server and a real server with the same IP address and creates a 1-to-1 binding between them:
dip <ip_addr>
where:
ip_addr is the address of both the virtual server and real server.

In-service and out-of-service commands may also be used:
in-service virtual|real|url <virtual_id|real_id|url_id>[all];
out-of-service virtual|real|url<real_id|virtual_id|url_id> [oos|maintenance|sticky|failed] [all].

The following link command is used to create an association between a URL and a virtual server:
link <url_id><virtual_id>;
where:
url_id is the URL that a link is being made for; and
virtual_id is the virtual whose weight/state the URL will inherit.

As can be observed from the foregoing, the HTTP redirection method and system of the present invention provides for a sticky connection while allowing a local director to perform effective load balancing. Furthermore, an SSL session or proxy server do not affect the sticky connection or load balancing.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A computer-implemented method for providing a persistent connection between a client and a server, the method comprising:
   binding a primary virtual server to a set of URLs, each URL having an associated real server;
   receiving a request from a client for connection to the primary virtual server;
   selecting one of the real servers for connection with the client;
   sending a redirect message to the client specifying the selected real server; and
   receiving a new connection request from the client for connection with the selected real server;
   wherein the client is connected to the selected real server for the duration of a transaction.

2. The method of claim 1 further comprising binding each of the real servers to a virtual server, each pair of real and virtual servers having the same IP address.

3. The method of claim 2 wherein the IP address is associated with the URL of the corresponding real server.

4. The method of claim 2 wherein each pair of real and virtual servers share weight assignments.

5. The method of claim 2 wherein each pair of real and virtual servers share state information.

6. The method of claim 1 wherein the client request is an HTTP request.

7. The method of claim 6 wherein the redirect is an HTTP redirect.

8. The method of claim 7 wherein the HTTP redirect comprises a URL of the selected real server.

9. The method of claim 1 wherein selecting one of the real servers comprises load balancing the real servers.

10. The method of claim 9 wherein load balancing is only performed in selecting one of the real servers for connection with the client.

11. The method of claim 1 further comprising providing a backup link for each of the real servers to the primary virtual server.

12. The method of claim 1 further comprising providing a backup link for each of the real servers to one of the other real servers.

13. The method of claim 1 further comprising binding an additional real server to the primary virtual server and load sharing between the new real server and the original set of real servers.

14. The method of claim 1 wherein receiving a request from a client comprises receiving a request at a local director.

15. The method of claim 1 further comprising forwarding messages from the client to a backup server associated with the selected real server for the duration of the transaction.

16. The method of claim 2 wherein a directed IP identifier provides one-to-one bindings between the virtual server and real server pairs.

17. The method of claim 16 further comprising linking said directed IP identifier to a URL.

18. The method of claim 16 further comprising a URL associated with the virtual server inheriting weights and states assigned to the directed IP identifier.

19. The method of claim 1 further comprising creating secondary virtual servers, each of said secondary virtual servers bound to one of the real servers.

20. The method of claim 1 further comprising:
receiving a request from the client during the transaction for connection to an SSL page; and
creating a link between the selected real server and the SSL page.

21. A computer-implemented method for load balancing between servers and providing a persistent connection between a client and a server, comprising:
receiving a request from a client for connection to a primary virtual server to start a session, the primary virtual server being bound to a plurality of secondary virtual servers each associated with a real server and having the same address as the real server;
selecting one of the real servers for connection with the client;
sending a redirect message to the client specifying the selected real server;
receiving a new request from the client for connection to the selected real server;
forwarding to the selected real server transmission originating from the client;
forwarding to the client transmission originating from the selected real server; and
continuing to forward transmission from the client to the selected server throughout the session.

22. The method of claim 21 wherein receiving a request from the client comprises receiving an HTTP request and forwarding to the selected real server transmission comprises forwarding an HTTP request.

23. The method of claim 22 further comprising sending an HTTP redirect message to the client, the HTTP redirect message identifying the selected real server.

24. A computer program product for providing a persistent connection between a client and a server, the product comprising:
code that binds a primary virtual server to a set of URLs, each URL having an associated real server;
code that receives a request from a client for connection to the primary virtual server;
code that selects one of the real servers for connection with the client;
code that sends a redirect message to the client specifying the selected real server;
code that receives a new request from the client for connection to the selected real server, wherein the client is connected to the selected real server for the duration of a transaction; and
a computer-readable storage medium for storing the codes.

25. The computer program product of claim 24 wherein the computer readable medium is selected from the group consisting of CD-ROM, floppy disk, tape, flash memory, system memory, hard drive, and data signal embodied in a carrier wave.

26. The computer program product of claim 24 further comprising code that binds each of the real servers to a virtual server, each pair of real and virtual servers having the same IP address.

27. The computer program product of claim 24 further comprising code that provides a backup server for each of the real servers.

28. A computer program product for binding a plurality of real servers to a primary virtual server for establishing persistent connections between a client and the real servers, the product comprising:
code that creates an identifier for each of the real servers;
code that binds the real servers to the primary virtual server;
code that creates a plurality of secondary virtual servers, each of the secondary virtual servers associated with one of the real servers and having the same address as the associated real server;
code that binds each of the secondary virtual servers with its associated real server;
code that maintains a persistent connection between a client and one of the real servers throughout a transaction; and
a computer-readable storage medium for storing the codes.

29. The computer program product of claim 28 wherein the real server identifiers are URLs.

30. The computer program product of claim 29 wherein the primary virtual server is bound to the URLs of the real servers.

31. The computer program product of claim 28 further comprising code that load balances the real servers.

32. The computer program product of claim 31 wherein load balancing is performed only to connect a client with one of the real servers at the start of a transaction.

33. A computer system for providing a persistent connection between a client and a server, the system comprising:
a virtual server;
a plurality of real servers each having an associated URL; and
a processor for binding the virtual server to the URLs of the real servers, selecting one of the real servers for connection to a client, redirecting a connection request for the virtual server from the client to the selected real server, the processor configured for creating a persistent connection between the selected real server and the client throughout a session.

34. The system of claim 31 further comprising a plurality of secondary virtual servers, each of said plurality of secondary virtual servers associated with one of said plurality of real servers.

35. The system of claim 34 wherein each pair of secondary virtual servers and real servers have the same IP address.

36. The system of claim 34 further comprising a local director comprising said processor and secondary virtual servers and configured to balance loads between said plurality of real servers.

37. A system for directing flow between a client and two or more servers, the system comprising:
a primary virtual server bound to a plurality of URLs, each URL having an associated real server;
means for receiving a client request for content;
means for selecting a real server for providing content to the client;
means for providing the URL of the selected real server to the client; and means for receiving a new connection request from the client for connection to the selected real server;

wherein the client is connected to the selected real server for the duration of a transaction.

38. A network apparatus for directing flow between a client and two or more servers, the network apparatus comprising:

memory; and a processor configured to:

bind a primary virtual server to a set of URLs, each URL having an associated real server;

receive a request from a client for connection to the primary virtual server;

select one of the real servers for connection with the client;

receive a new connection request from the client for connection with the selected real server;

send a redirect message to the client specifying the selected real server; and receive a new connection request from the client for connection with the selected real server;

wherein the client is connected to the selected real server for the duration of a transaction.

* * * * *